United States Patent
Paal et al.

(10) Patent No.: US 10,927,943 B2
(45) Date of Patent: Feb. 23, 2021

(54) MECHANICAL DRIVE

(71) Applicant: Liebherr-Components Biberach GMBH, Biberach an der Riß (DE)

(72) Inventors: Martin Paal, Biberach an der Riß (DE); Frowin Wack, Biberach an der Riß (DE); Norbert Hausladen, Biberach an der Riß (DE)

(73) Assignee: Liebherr-Components Biberach GMBH, Biberach an der Riss (DE)

( * ) Notice: Subject to any disclaimer, the term of this patent is extended or adjusted under 35 U.S.C. 154(b) by 0 days.

(21) Appl. No.: 15/370,949

(22) Filed: Dec. 6, 2016

(65) Prior Publication Data

US 2017/0082189 A1 Mar. 23, 2017

Related U.S. Application Data

(63) Continuation of application No. PCT/EP2015/001147, filed on Jun. 5, 2015.

(30) Foreign Application Priority Data

Jun. 6, 2014 (DE) ...................... 20 2014 004 715.4
Sep. 2, 2014 (DE) ...................... 20 2014 007 164.0

(51) Int. Cl.
*F16H 57/04* (2010.01)

(52) U.S. Cl.
CPC ....... *F16H 57/0431* (2013.01); *F16H 57/043* (2013.01); *F16H 57/046* (2013.01)

(58) Field of Classification Search
CPC ............... F16H 57/0426; F16H 57/043; F16H 57/0431; F16N 25/04; F16N 2210/025; F16N 2210/12

(Continued)

(56) References Cited

U.S. PATENT DOCUMENTS 1,502,083 A * 7/1924 Zoelly ................. F16H 57/0431
184/15.1
3,424,022 A * 1/1969 Greenberg .......... F16H 57/0431
74/409

(Continued)

FOREIGN PATENT DOCUMENTS

CN 101443579 5/2009
DE 10321535 10/2004

(Continued)

OTHER PUBLICATIONS

English Translation of JP2001-208173 (Year: 2001).*

*Primary Examiner* — Bobby Rushing, Jr.
(74) *Attorney, Agent, or Firm* — Levine Bagade Han LLP (57) ABSTRACT

The present invention relates to a drive for reaching a desired position of a component such as of a rotor blade, a crane tower, a superstructure and the like, having at least two drive elements that are in toothed engagement with one another and of which at least one is drivable from a drive source and the other is connectable to the component, and having a lubricating device for lubricating the drive elements, wherein at least one lubricant passage for the supply of lubricant to a meshing tooth pair is led through one of the drive elements. It is proposed to effect the supply of the lubricant by a distributor that is connected upstream of the lubricant passage integrated in the drive element and to control the connection between a supply passage of the distributor and the at least one lubricant passage integrated in the drive element by a relative movement between the drive element and the distributor.

20 Claims, 8 Drawing Sheets

(58) Field of Classification Search
USPC .......... 74/467, 468; 184/6.12, 13.1, 31; 475/159
See application file for complete search history.

(56) References Cited

U.S. PATENT DOCUMENTS

| | | | | |
|---|---|---|---|---|
| 3,822,607 | A * | 7/1974 | Tharaldsen | F16H 57/0431 74/468 |
| 4,341,296 | A * | 7/1982 | Schaefer | F16C 33/6659 192/113.5 |
| 5,993,349 | A * | 11/1999 | Sugihara | F16H 15/38 476/8 |
| 7,172,054 | B2 * | 2/2007 | Ruther | F16H 57/0456 184/6.26 |
| 7,244,097 | B2 * | 7/2007 | Hinz | F03D 7/0224 415/122.1 |
| 8,047,332 | B2 * | 11/2011 | Salmela | F16H 57/0431 184/13.1 |
| 8,196,489 | B2 * | 6/2012 | Paluncic | F04C 2/084 74/468 |
| 8,256,318 | B2 * | 9/2012 | Vassaux | F16H 57/0431 184/6.12 |
| 9,033,109 | B2 * | 5/2015 | Segovia | F16H 57/0431 184/14 |
| 9,816,602 | B2 * | 11/2017 | Beisel | F16H 57/0471 |
| 9,890,766 | B2 * | 2/2018 | Pasquet | F03D 7/0224 |
| 2006/0204360 | A1 | 9/2006 | Hinz et al. | |
| 2007/0293365 | A1 * | 12/2007 | Thoma | F16H 57/0431 475/331 |
| 2008/0276743 | A1 | 11/2008 | Salmela et al. | |
| 2014/0286775 | A1 * | 9/2014 | Pasquet | F16H 57/0431 416/155 |
| 2015/0345615 | A1 * | 12/2015 | Beisel | F16H 57/0471 74/468 |

FOREIGN PATENT DOCUMENTS

| | | | |
|---|---|---|---|
| DE | 102012101593 | 8/2013 | |
| EP | 1816346 | 12/2013 | |
| JP | 60-104869 | 6/1985 | |
| JP | 61136059 A * | 6/1986 | |
| JP | 2001-208173 | 8/2001 | |
| JP | 2011-144837 * | 7/2011 | ............ F16H 55/17 |
| WO | WO 2007/131604 | 11/2007 | |

* cited by examiner

MECHANICAL DRIVE

CROSS-REFERENCE TO RELATED APPLICATIONS

The present application is a continuation of PCT Application No. PCT/EP2015/001147, filed Jun. 5, 2015, which claims priority to German Utility Model Application No. 20 2014 004 715.4, filed Jun. 6, 2014, and German Utility Model No. 20 2014 007 164.0, filed Sep. 2, 2014 and issued Sep. 8, 2015, all of which are incorporated by reference herein in their entireties.

BACKGROUND

The present invention relates to a drive fix reaching, a desired position of a component such as of a rotor blade, a crane tower, a superstructure and the like, having at least two drive elements that are in toothed engagement with one another and of which at least one is drivable from a drive source and the other is connectable to the component, and having a lubricating device for lubricating the drive elements, wherein at least one lubricant passage for the supply of lubricant to a meshing tooth pair is led through one of the drive elements.

It is often sufficient on drives using drive elements meshing with one another to supply the lubricant such as grease, lubricating oil or the like to any desired point, of a gear or of a tooth rack since the lubricant is distributed at least gradually over all the tooth flanks due to the constant roll-off movement. This is, however, different with so-called pitch drives or generally with drives that are only actuated occasionally or that only maintain one position or only some few positions under load over a longer time. With a long dwell time in a specific position, wear occurs at the meshing tooth pairs and/or tribocorrosion occurs under the influence of vibrations and associated micromovements, load changes or also as a result of play. The meshing tooth flanks of such drive elements maintaining a position over a longer time rub off the lubricant by micromovements such that the tooth flanks can lie on another in a bare manner. Pitting, scratches and wear occur.

Drives in which no constant revolutionary movement occurs, but rather in which specific tooth pairs predominantly bear a portion of the load over a long time can be used, for example, in wind turbines to set the angle of engagement of the rotor blades as is described, for example, in the document EP 1816346 B1. Such drives can, however, also be used in construction machinery, for example, in slewing mechanisms, by means of which the tower of a revolving tower crane or the superstructure of another crane or construction machinery unit can be rotated or in hoisting mechanisms with which the boom of a crane, for example, can be brought into different positions. Other applications with similar load cases can be found in many sectors in which a component is brought into a desired position and is held there over a longer time.

In order also to lubricate the tooth flanks sufficiently in such applications and to protect them from pitting, wear, scratches and similar, it is known to conduct the lubricant directly onto the meshing tooth flanks or to lubricate a tooth pair when it is in mutual toothed engagement. The aforesaid document EP 1816346 B1, for example, describes a lubrication apparatus having a lubricant passage that is guided through the interior of an output pinion and that ends at a dedendum so that lubricant can be supplied to the tooth flanks adjacent to the dedendum and to the tooth engaging therebetween of an oppositely disposed gear, that is a meshing pair of teeth can be lubricated directly. To prevent the lubricant from escaping in an uncontrolled manner when the drive elements are brought into a different relative position in which the lubricant passage no longer leads to a meshing tooth pair, but rather, so-to-say, opens into the free air, a valve can be associated with the lubrication passage in accordance with the aforesaid EP 1816346 B1 that only opens when the tooth flanks to be lubricated are in engagement.

Such a valve is, however, relatively complex and expensive and also itself prone to wear. It is additionally difficult to lubricate a then different meshing pair of teeth sufficiently on an adjustment of the drive elements relative to one another without adjusting the plant to a larger or longer extent in order also to bring the lubricant introduced at one point to other points by distribution effects. A reduction of the construction size is moreover prevented or made more difficult.

An adjustment of the plant or the traveling to different positions is, however increasingly required in dependence on the plant with controls that are becoming more complex. This also applies, for example, to the rotor blades of wind turbines that are increasingly or more and more precisely adapted to the respective prevailing wind conditions, that are generally known to fluctuate, to increase efficiency and whose angles of engagement are adjusted for this purpose.

It is therefore the underlying object of the present invention to provide an improved drive of the initially named kind that avoids disadvantages of the prior art and further develops the latter in an advantageous manner. A sufficient, precise lubrication of the tooth flanks at risk should in particular be made possible with a simple, inexpensive arrangement of compact construction under drive conditions that both remain stationary for longer times and that change.

SUMMARY OF THE INVENTION

The named object is achieved in accordance with the invention by a drive in accordance with claim 1. Preferred embodiments of the invention are the subject of the dependent claims.

It is therefore proposed to effect the supply of the lubricant by a distributor that is connected upstream of the lubricant passage integrated in the drive element and to control the connection between a supply passage of the distributor and the at least one lubricant passage integrated in the drive element by a relative movement between the drive element and the distributor. The lubricant supply to the at least one lubricant passage of the drive element can in particular be selectively released and interrupted or varied by a movement of the drive element with respect to the distributor connected upstream. In accordance with the invention, the lubrication apparatus has a distributor having at least one supply passage that is connectable to the at least one lubricant passage, with the drive element being movable relative to the distributor such that the at least one lubricant passage of the drive element is connected to the supply passage of the distributor or is cut off from the named supply passage of the distributor in dependence on the position of the drive element relative to the distributor.

Instead of controlling the lubricant supply at the outlet of the integrated lubricant passage in the drive element by a valve under the difficult space conditions there, the lubricant supply can be controlled at the inlet side or at the upstream side of the end section of the integrated lubricant passage of the drive element. An additional valve assembly at the outlet side end of the integrated lubricant passage of the drive element can hereby be dispensed with, although such a valve assembly could nevertheless still be provided. Due to the relative movability of the drive element and of the distributor, the lubricant supply can be controlled such that the supply passage of the distributor is brought into mutual coverage or into mutual alignment with the lubricant passage of the drive element or is alternatively brought out of coverage or out of alignment so that the flow communication between the supply passage at the distributor side and the drive element of the lateral lubricant passage can be released and interrupted or can at least be varied in terms of size.

To be able to lubricate different tooth flank pairs when they are meshing, a plurality of lubricant passages can be provided at the drive element that result in different gear tooth sections or in different teeth of the drive element. At the inlet side, the named plurality of lubricant passages are advantageously arranged or configured such that the different lubricant passages can be fed from the same distributor and can in particular be brought into flow communication with the same supply passage of the distributor, and indeed advantageously relative to the distributor in dependence on the position of the drive element. The inlet regions of the plurality of lubricant passages that can be integrated into the drive element can in particular be arranged distributed along a trajectory of the distributor relative to the drive element or can be arranged behind one another or spaced apart from one another so that on a relative movement of the drive element relative to the distributor a respective different lubricant passage moves consecutively into flow communication with the supply passage of the distributor.

In this respect, the opening region of the supply passage can be dimensioned and can be coordinated with the spacing, of the inlet regions of the lubricant passages such that at least one lubricant passage and/or at most two or a specific number of or a ratio in the sense of a subgroup of lubricant passages are always simultaneously in flow communication with the supply passage in dependence on the position of the drive element, and indeed advantageously always that or those lubricant passage or passages that leads or lead to gear tooth sections of the drive element that mesh with the drive element.

The coordination of the position and of the geometry of the opening of the supply passage to the position and the geometry and/or spacing of the inlet openings of the lubricant passages can, however, also be differently configured depending on the lubricant provision, for example such that the supply passage is completely closed by the drive element or by a closure surface provided thereat and adjacent to the inlet opening of a lubricant passage in at least one specific position of the drive element relative to the distributor and at least one lubricant passage is connected to the supply passage in at least one further relative position of the drive element.

The relative kinematics between the drive element and the distributor can in this respect generally be differently constituted depending on how the drive element is configured. If the drive element is an output pinion that is rotationally drivable, the lubricant passages of the drive element can be arranged at the inlet side on a part circle coaxially to the axis of rotation of the output pinion so that the different lubricant passages can be brought into flow communication with the supply passage of the distributor in the manner of a revolver by rotating the output pinion relative to the distributor. A respective different lubricant passage of the drive element is brought into flow communication with the supply passage of the distributor by a further rotation of the drive element.

The output pinion can in this respect advantageously comprise an inner recess on whose jacket surface the lubricant passages open at the inlet side or from which they start at the inlet side. In this case, the distributor can be seated in the named inner recess formed coaxially to the axis of rotation of the pinion, with an opening of the supply passage of the distributor being able to be positioned at the side of the outer jacket surface such that the opening of the supply passage drags over or moves over the inner peripheral surface of the inner recess of the drive element on a relative rotation between the output pinion and the distributor.

Alternatively to such an arrangement of the inlet openings of the lubricant passages of the drive element and of the opening of the supply passage of the distributor at the peripheral side, the opening, of the supply passage of the distributor can, however, also be seated on the drive element at the front side, with the inlet openings of the lubricant passages of the drive element in this case advantageously being able to be provided on apart circle coaxially to the axis of rotation of the output pinion on it front side. Such a front-side interface between the distributor and the drive element can be advantageous with particularly small output pinions to provide space in the axial region here, for example for a spline shaft gearing or the like. On the other hand, with sufficient space conditions, a receiver of the distributor in an inner recess or an arrangement of the interface at the peripheral side between the lubricant passage at the drive element side and the supply passage at the distributor side can be advantageous with respect to a simple production of the lubricant passages since directional boreholes having oval opening cross-sections can be avoided here.

The drive element does not however, necessarily have to be an output pinion, but a toothed rack can rather also be provided that includes the named at least one lubricant passage. Depending on the design of the actuator, the drive element pairing can also comprise such a toothed rack and an output pinion meshing therewith or also a worm shaft and a gear meshing therewith. The integrated lubricant passage or the named plurality of lubricant passages can in this respect be provided in the toothed rack and/or in the output pinion and/or in the worm shaft and/or in the gear.

A respective different one of the lubricant passages comes into flow communication with the supply passage of the distributor by a further movement of the drive element provided with lubricant passages.

The drive element provided with the at least one lubricant passage can generally be the driven drive element or the driving, drive element. In an advantageous further development of the invention, the drive element drivable by a drive source can be provided with the named at least one lubricant passage to be able to supply the lubricant from the drive side to the meshing tooth pair. Synergy effects can hereby be utilized since the drive side or the drive source or transmission groups associated therewith can typically also be lubricated.

If the lubricant is supplied via a rotationally drivable drive element, the previously named plurality of lubricant passages can advantageously be arranged in star shape, and can in particular be led to different tooth dedenda or tooth flanks or addenda starting from a common part circle.

In this respect, the number of lubricant passages can generally correspond to the number of teeth of the drive element so that each tooth or each tooth flank can be lubricated via a corresponding lubricant passage. It can alternatively optionally also be sufficient, however, to provide fewer lubricant passages as teeth, for example when the desired positions to be traveled to are not evenly distributed over the positions of the drive element, but rather only two or three or some tooth pairs come into engagement particularly frequently because corresponding desired positions are to be traveled to.

The relative movement between the drive element and the distributor controlling the lubricant supply can generally be generated in different manners. For example, with a stationary or also with a moving, drive element, the distributor can be moved to block the lubricant supply to a specific lubricant passage of the drive element or to bring it into engagement with a specific lubricant passage. In an advantageous further development of the invention, alternatively to this, the distributor can be held or can be supported in fixed position, with the named relative movement coming about by the drive movement of the drive element.

With such a stationary arrangement of the distributor, the supply passage of the distributor can in particular be oriented or positioned such that the lubricant passage or a respective lubricant passage of the drive element moves into or is in flow communication with the supply passage at the distributor side when the gear tooth section of the drive element at which the named respective lubricant passage opens is in toothed engagement with the drive element cooperating therewith.

The opening region of the supply passage of the distributor can in particular face the spatial region in which the two drive elements are in gear tooth engagement with one another with a fixed arrangement of the distributor. If, for example, the two drive elements are configured as gears and are arranged above one another, with the drive element disposed at the bottom serving the lubricant supply, the supply passage of the distributor associated with this drive element disposed at the bottom can be oriented such that the supply passage opens in the region of 12 o'clock. Accordingly, a lubricant passage provided in the drive element always moves into flow communication with the supply passage of the distributor when the named lubricant passage is oriented in the region of 12 o'clock so that, with an approximately radial arrangement of the lubricant passage, the gear tooth section disposed in the region of 12 o'clock and thus the section in gear tooth engagement is lubricated.

The lubricant supply to the distributor can generally take place in different manners. If an output pinion drivable from a drive source is lubricated via the distributor, the lubricant supply to the distributor can advantageously take place from the drive source, in particular through the interior of the drive source and/or of an interposed transmission. For example, a supply passage that passes through the drive source and/or through the drive transmission can be provided that is connected to the fixedly held distributor. Such a supply line coming from the drive source side can in particular be led coaxially to the main axis of a drive transmission and/or of the main axle of a drive motor.

Alternatively to a lubricant supply from the drive side, the distributor can, however, also be provided with lubricant from a side remote from the drive source. A short, supply path can hereby be made possible.

To minimize or to optimize the required lubricant quantity, a seal of the drive element or a seal of at least one of the drive elements and/or of the engagement region can be provided. For example, a lubricant cap can cover the drive element through which the lubricant is supplied, with the named lubricant cap advantageously also being able to provide an at least sectional enveloping of the drive element meshing therewith and/or also a seal to this drive element meshing therewith.

BRIEF DESCRIPTION OF THE DRAWINGS

The invention will be explained in more detail in the following with respect to preferred embodiments and to associated drawings. There are shown in the drawings.

DETAILED DESCRIPTION

Figure 1:
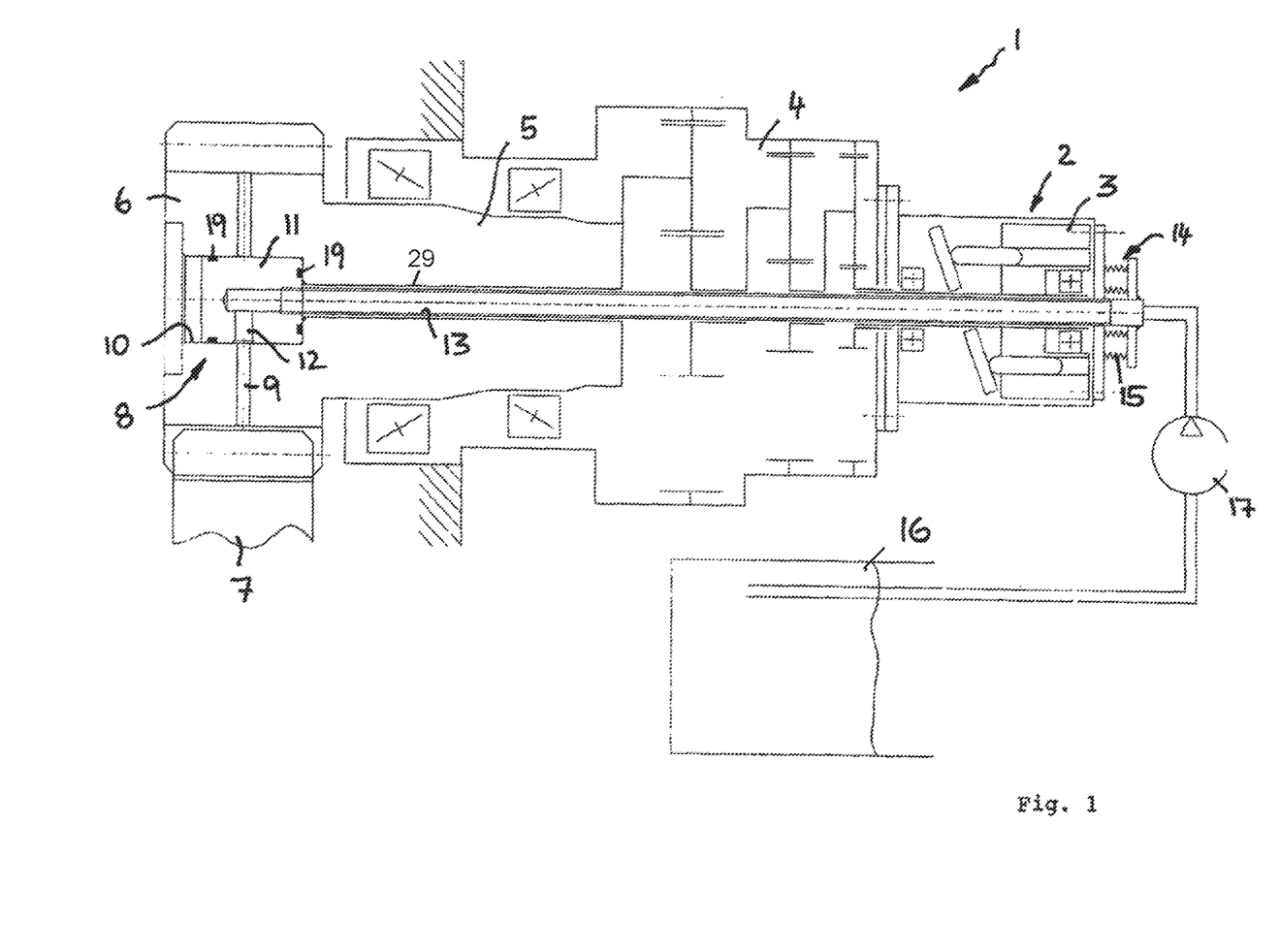
FIG. 1: a drive in accordance with an advantageous embodiment of the invention that comprises an inline hydraulic motor as a drive source and that drives an output pinion that has integrated lubricant passages that can be fed from a distributor.

As FIG. 1 shows, the drive 1 can be configured as a rotary drive and/or as an actuator and can comprise an inline hydraulic motor 3 as a drive source 2 that drives a transmission 4 at the outlet side that can be configured in one stage or in multiple stages, for example in the form of a planetary transmission.

The transmission 4 can drive a drive element 6, that can be configured as a toothed output pinion, for example, via a drive shaft 5 at the output side.

The drive element 6 drivable from the drive source 2 is in gear tooth engagement with a further drive element 7 that, depending on the configuration of the equipment to be driven, can likewise be configured as a gear, for example in the form of a drive element having external teeth. Alternatively, the named drive element 7 can, however, also be a rack if a rotational drive movement is to be converted into a linear drive movement.

The component to be driven, that can be connected to the drive element 7, can generally be of different designs; it can for example be a rotor blade of a wind turbine, with other applications, however, also being possible, as mentioned above. The angle of engagement of the rotor blade can be set or adjusted by means of the drive 1, for example.

As FIG. 1 shows, the drive 1 can have a coaxial construction, with the drive element 6 being able to be arranged mutually coaxially with the output shaft 6 and/or with the transmission 4 and/or with the drive source 3 and/or with subgroups of these components.

Figure 2:
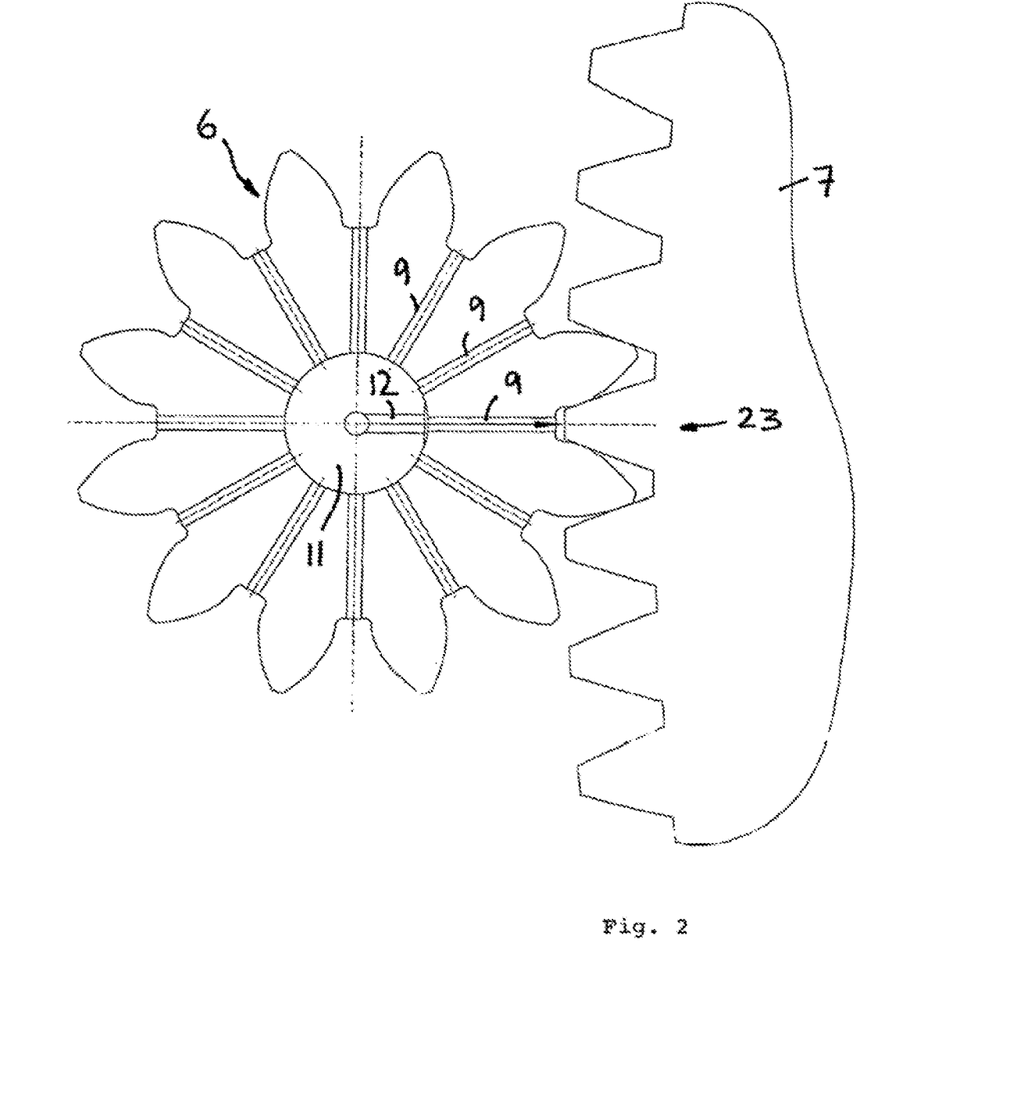
FIG. 2: a schematic plan view of the output pinion of the drive of FIG. 1 and of the gear that cooperates therewith and that is connectable to a component to be positioned, with the distributor for distributing the lubricant and its connection to a lubricant passage of the output pinion being shown that leads to a meshing tooth pair.
Figure 3:
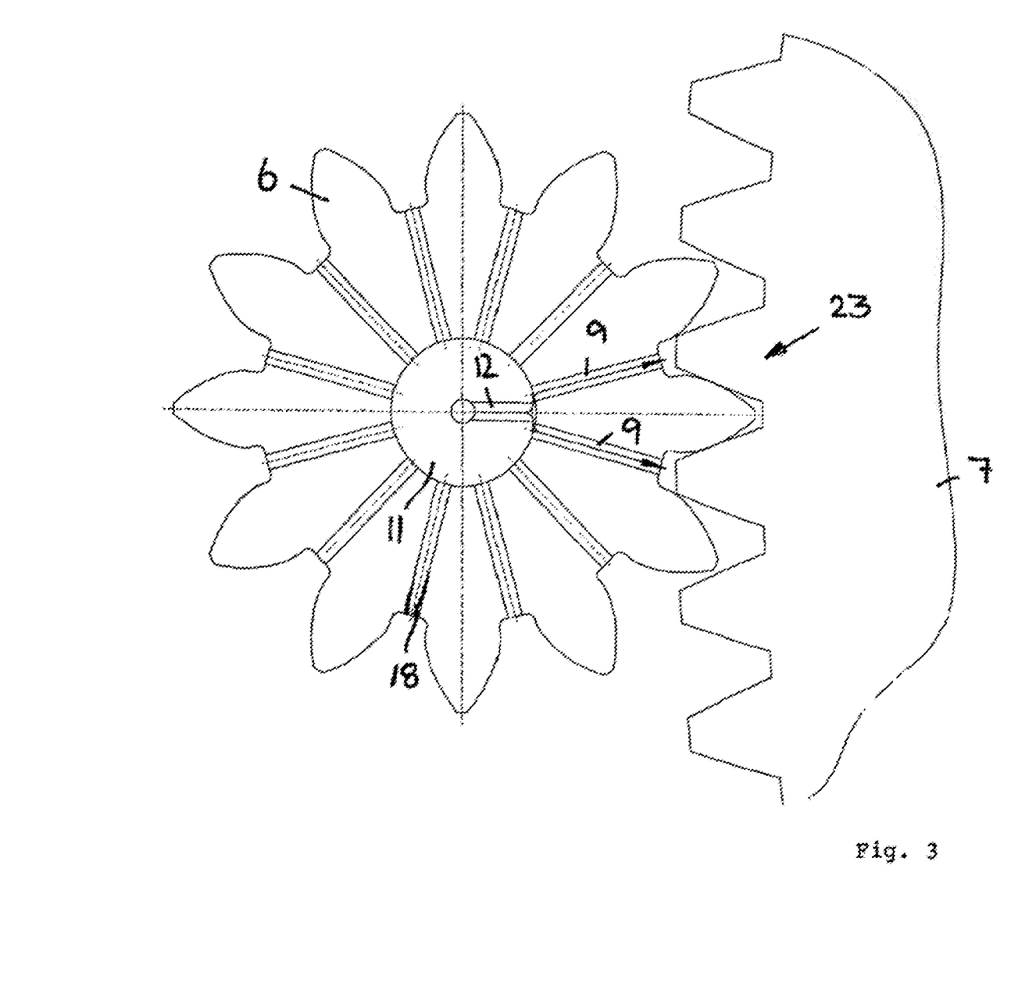
FIG. 3: a schematic plan view of the output pinion of the drive of FIG. 1 in a representation similar to FIG. 2, with the drive pinion being shown a position that has been moved a little further and in which two lubricant passages in the interior of the output pinion are in flow communication with the supply passage of the distributor to simultaneously lubricate two meshing tooth pairs.

As FIGS. 1 to 3 show, a drive assembly in generating engagement and comprising the aforesaid drive elements 6 and 7 can be lubricated by means of a lubrication apparatus 8, with a lubricant supply advantageously being able to take place specifically to the sections of the two drive elements 6 an 7 in generating engagement, in particular in gear tooth engagement. As FIGS. 2 and 3 show, the lubricant can be led directly to the tooth pairs in gear tooth engagement.

The drive element 6 drivable from the drive source 2 can in this respect comprise a plurality of lubricant passages 9 that can be embedded in the interior of the drive element 6 or that can be integrated into the named drive element 6. The named lubricant passages 9 can in particular be arranged distributed in approximately star shape and can lead to respectively different gear tooth sections of the drive element 6. The lubricant passages 9 can advantageously open at the opening side in the dedendum regions between the tooth flanks of the drive element 6.

At the inlet side, the lubricant passages 9 can start from an inner recess 10 of the drive element 6, with the named inner recess 10 being able to be a, for example, cylindrical or conical hollow space coaxial to the axis of rotation of the drive element 6. The named inner recess 10 can in this respect be formed as a pot-shaped blind hole that can optionally be closable by a cover or can also be formed as a passage recess.

The named lubricant passages 9 can start from the peripheral surface of the named inner recess 10 and can lead in the named manner in star shape to the dedenda of the gear teeth section, cf. FIG. 2.

The named lubricant passages 9 can be fed with lubricant from the lubrication apparatus 8 by means of a distributor 11, with the named distributor 11 advantageously being able to be received in the named inner recess 10 of the drive element 6.

The distributor 11 has a supply passage 12 whose opening is located at the outer peripheral side at the distributor 11 and faces the peripheral wall of the inner recess 10. The distributor 11 can comprise a rotationally symmetrical body overall that can be adapted in shape to the inner recess 10; for example a cylinder body or a conical body or also rotational body chamfered step-wise. The distributor 11 can, however, optionally also have a different contour, for example as a spoke body that only contacts or faces the inner recess 10 sectionally.

The named supply passage 12 can be led out of the distributor 11 at the front side.

As FIGS. 2 and 3 illustrate, the supply passage 12 of the distributor 11 can be brought into flow communication with or to cover at least one of the lubricant passages 9 of the drive element to so that lubricant exiting the supply passage 12 enters into the at least one lubricant passage 9 of the drive element 6.

The distributor 11 can advantageously be arranged as stationary or as rotationally fixed so that the supply passage 12 of the distributor 11 has a fixed alignment. Which lubricant passage 9 of the drive element 6 comes into flow communication with the supply passage 12 of the distributor 11 can be controlled by a relative movement of the drive element 6. The supply passage 12 of the stationary distributor 11 is in particular oriented such that that respective lubricant passage 9 that leads to the respective just meshing gear tooth section of the drive element 6 comes into flow communication with the supply passage 12 of the distributor 11.

For this purpose, the named supply passage 12 can in particular face the spatial region 23 in which the gear tooth engagement or generating engagement takes place between the drive element 6 and the drive element 7.

As a comparison of FIGS. 2 and 3 shows, the opening region of the supply passage 12 can in this respect be dimensioned and/or can be coordinated with the spacing of the inlet regions of the lubricant passages 9 such that, depending on the rotational position of the drive element 6, at least one lubricant passage 9 and/or at most two lubricant passages 9 are always simultaneously in flow communication with the supply passage 12, and indeed in each case advantageously always that or those lubricant passage (s) 9 that leads/lead to gear tooth sections of the drive element 6 that mesh with the drive element 7.

The coordination of the position and geometry of the opening of the supply passage 12 with the position and geometry and/or spacing of the inlet openings of the lubricant passages 9 can, however, also have a different design in dependence on the lubrication task; for example, such that the supply passage 12 is completely closed in at least one specific position of the drive element 6 relative to the distributor 11 and at least one lubricant passage 9 is connected to the supply passage 12 in at least one further relative position of the drive element 6.

The lubricant supply to the named distributor 11 can take place from a front side of the distributor 11, with a supply line 13 being able to be connected to the distributor 11 at the end face or being able to be in flow communication therewith.

As FIG. 1 shows, the lubricant provision can advantageously take place from the side of the drive source 2, with the supply line 13 being able to be led coaxially through the drive shaft 5 and/or through the transmission 4 and/or through the drive source 2 in an advantageous further development of the invention. Such a leading of the lubricant provision through the actuator or at least through individual assemblies of the actuator can be utilized to allow lubricant already to branch off or exit before the distributor 11 at individual points, for example in the transmission region or at bearing points, for example in that outlet openings are provided that lead off at the supply line 13 at the peripheral side.

In an advantageous further development of the invention, the supply line 13 can be used for supporting the distributor 11, in particular for holding the distributor 11 rotationally fixedly. The distributor 11 can, for example, be firmly fixed to the stationary supply line 13. Alternatively, however, the supply line 13 can also be led to this distributor 11 independently of the support of the distributor 11, with a pipe 29 (e.g., a hollow pipe, a conducting pipe, a bearing pipe), for example, being able to be led through the actuator 1 in this case, the pipe 29 then in turn being able to take over the bearing function for the distributor 11 and with the supply line 13 in particular being able to extend into its inner space.

As FIG. 1 shows, the rotational locking by means of a support of the named passage pipe and/or by means of the supply line 13 can be provided at the side of the drive source 2, with a corresponding rotationally fixed support 14 being, able to allow a length compensation that is indicated by the spring element 15 that can be seen in FIG. 1.

The supply line 13 is charged from a lubricant reservoir 16 by means of a lubricant pump 17 or by means of another suitable conveying means to supply the distributor 11 with lubricant through the supply line 13, with the lubricant in turn being distributed from said distributor to the corresponding lubricant passages 9 of the drive element 6, as previously described.

The lubricant discharge at the opening of the respective lubricant passage 9 can, for example, take place by means of a lubricant nozzle 18 that can be associated with the lubricant passages 9 at the outlet side and can, for example, be arranged in the region of the dedenda. A specific back pressure can be generated by means of such a lubricant nozzle, that can serve the spray lubrication and/or a saving of lubricant and can also be used for monitoring the lubrication system.

As FIG. 1 shows, the distributor 11 can be sealed in the inner recess 10 of the drive element 6 by means of sealing elements 19, for example in the form of ring seals, to avoid an unwanted incorrect discharge of the lubricant or to directly restrict a lubricant discharge only via the lubricant passages 9.

Figure 4:
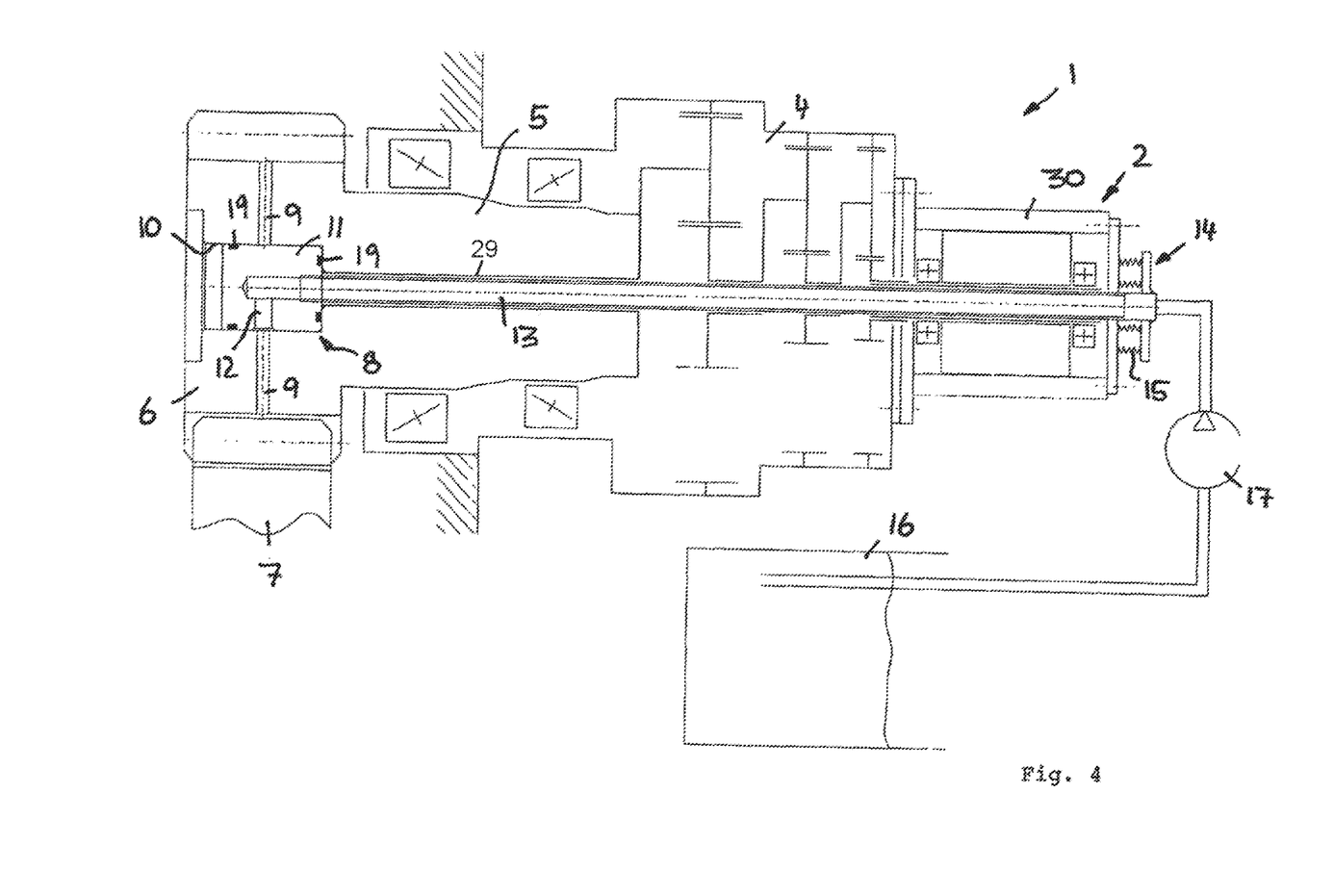
FIG. 4: a schematic representation of a drive similar to FIG. 1, with the actuator in accordance with a further embodiment of the invention having an electric motor instead of a hydraulic motor as the drive source.

As FIG. 4 shows, the actuator 1 can also comprise other motors as a drive source 2, for example an electric motor 30 instead of the hydraulic motor 3 shown in FIG. 1. In another respect, the embodiment of FIG. 4 substantially corresponds to the embodiment of FIG. 1 so that reference is made thereto to avoid repetition.

The supply line 13 and/or a pipe 29 (e.g., a hollow pipe, a conducting pipe, a bearing pipe) that surrounds the supply line 13 and through which the lubricant supply line 13 can be extended can, on the use of such an electric rotor 30, be led through its rotor, cf. FIG. 4.

Figure 5:
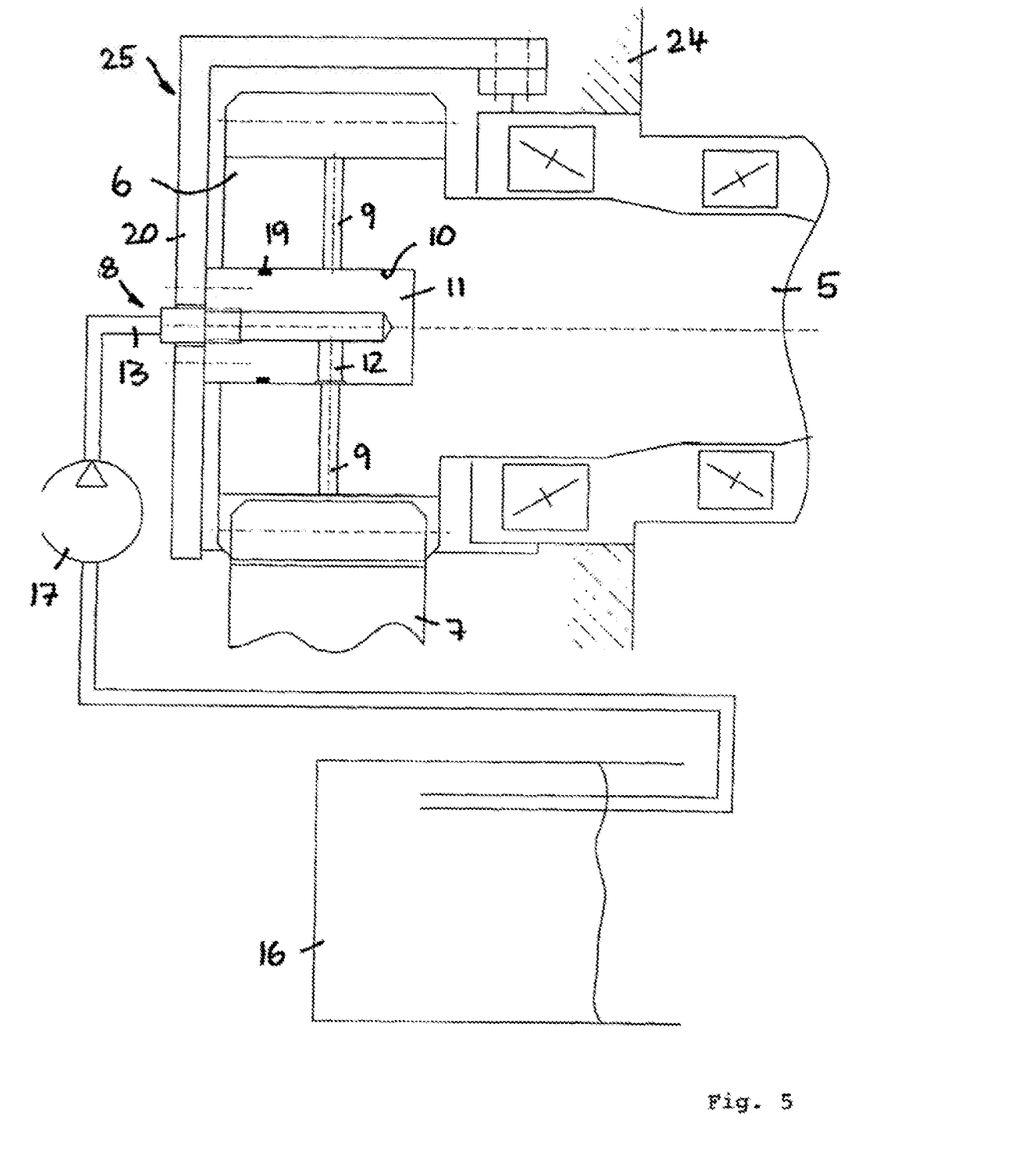
FIG. 5: a sectional representation of the drive element to be lubricated and of the distributor connected thereto in accordance with a further embodiment of the invention, with the lubricant supply taking place from a side of the drive element remote from the drive source and with the drive element being at least partly sealed by a lubricant cap.

As FIG. 5 shows, the lubricant provision of the distributor 11 can also take place, alternatively or additionally to a lubricant provision from the side of the drive source 2, from a side of the drive element 6 remote from the drive source 2. The supply line 13 can in this respect likewise be guided to the distributor 11 at the front side or can be connected to the distributor 11 at the front side.

With such a lubricant provision from the side of the drive element 6 remote from the transmission 4 and/or from the drive source 2, the support of the distributor 11 can also take place from this named remote side in a simple manner. The distributor 11 can, for example, be rotationally fixedly fastened to a bearing plate 20 and/or to a support arm or to another bearing carrier that can, for example, be connected in an articulated manner or can be fastened to the transmission housing of the transmission 4, to another housing component or to another stationary component of the actuator.

As FIG. 5 shows, the named bearing plate 20 can in this respect advantageously be configured in the form of a lubricant cap 25 that at least partly surrounds the drive element 6 and hereby prevents an unwanted lubricant discharge. The named lubricant cap 25 can, for example, be sealingly attached to the transmission housing 24 and/or can be sealed with respect to the section of the drive element 7 in generating engagement, for example in the form of a labyrinth seal and/or a sliding seal.

Figure 6:
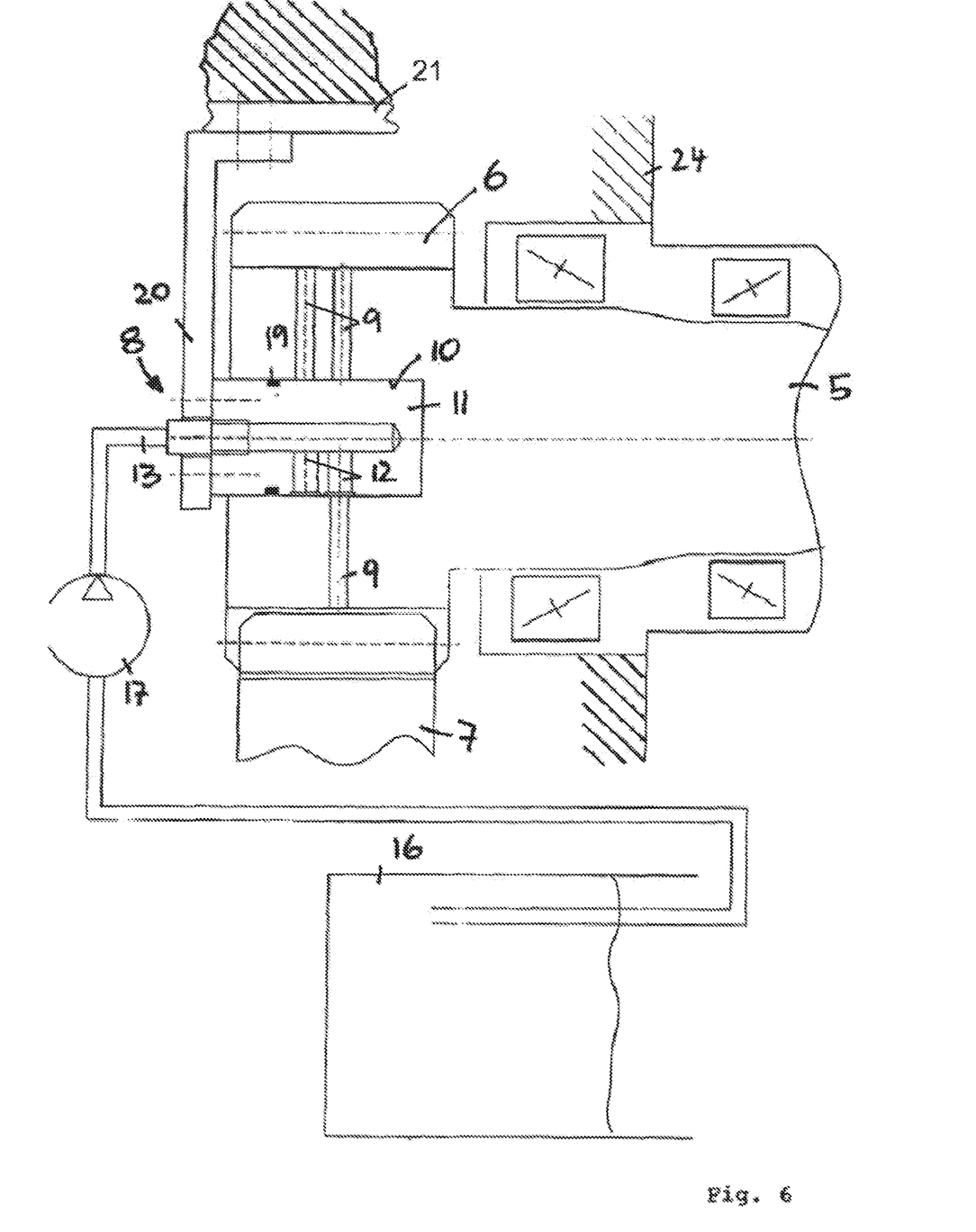
FIG. 6: a sectional representation of the drive element to be lubricated and of the distributor connected thereto in a representation similar to FIG. 5, with the lubricant supply also taking place from the side remote from the drive source here and with a sealing with respect to the housing taking place.

As FIG. 6 shows, the previously named bearing plate 20 or a corresponding bearing part for the rotationally fixed holding of the distributor 11 can also be fastened to a housing part 21 at the output side and/or can be sealingly fixed thereto.

Figure 7:
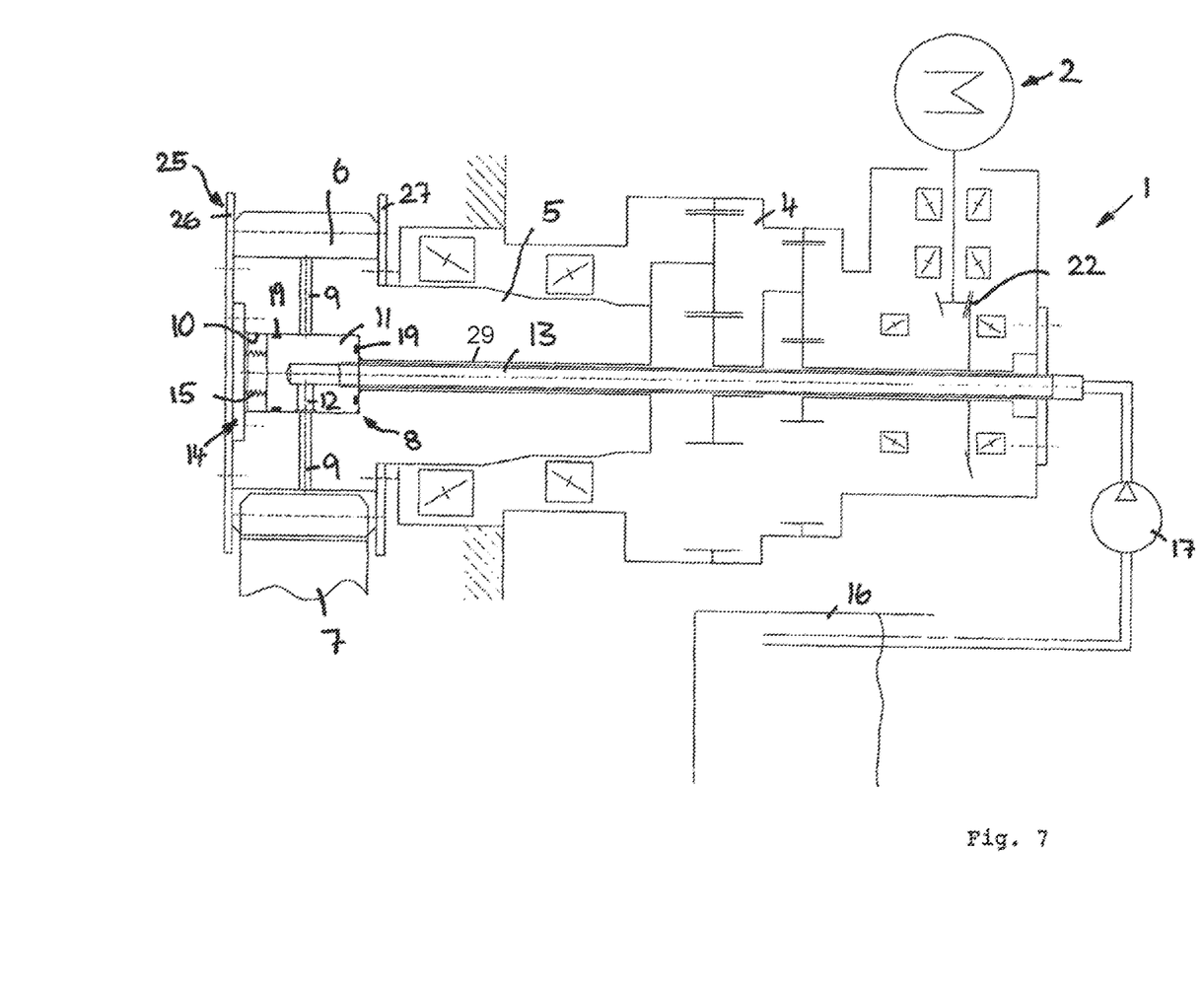
FIG. 7: a schematic representation of a drive similar to FIG. 1 in accordance with a further embodiment of the invention, with the drive source being linked via a bevel gearing from a peripheral side of the actuator, with a fixing and a longitudinal compensation being provided for the distributor on the output side or on the side of the drive element remote from the drive source.

As FIG. 7 shows, the drive source 2 in the form of a suitable motor can also be laterally connected to the drivetrain of the actuator 1, in particular to the gearbox input shaft of the transmission 4, for example via a spur gear 22, a conical gear or a worm gear.

The lubricant cap 25 can be designed in the form of two cover plates 26 and 27.

In cooperation with such a lateral drive source connection, but also independently thereof, the rotational fixing of the distributor 11 can also take place at the side of the drive element 6 remote from the transmission 4 or from the drive source 2, as the support 14 indicates, whose springs 15 illustrate the length compensation with respect to the drivetrain comprising the drive element 6, the drive source 5 and/or the transmission 4. In this respect, the lubricant provision of the distributor 11 can in turn take place from the drive side, in particular by means of a supply line 13 that can extend coaxially through the output shaft 5 and/or through the transmission 4 and/or through the spur gear stage 22. In this respect, the supply line 13 can itself form a stationary pipe or can also be configured as a hose or as a pipe that is received in a reception pipe.

Figure 8:
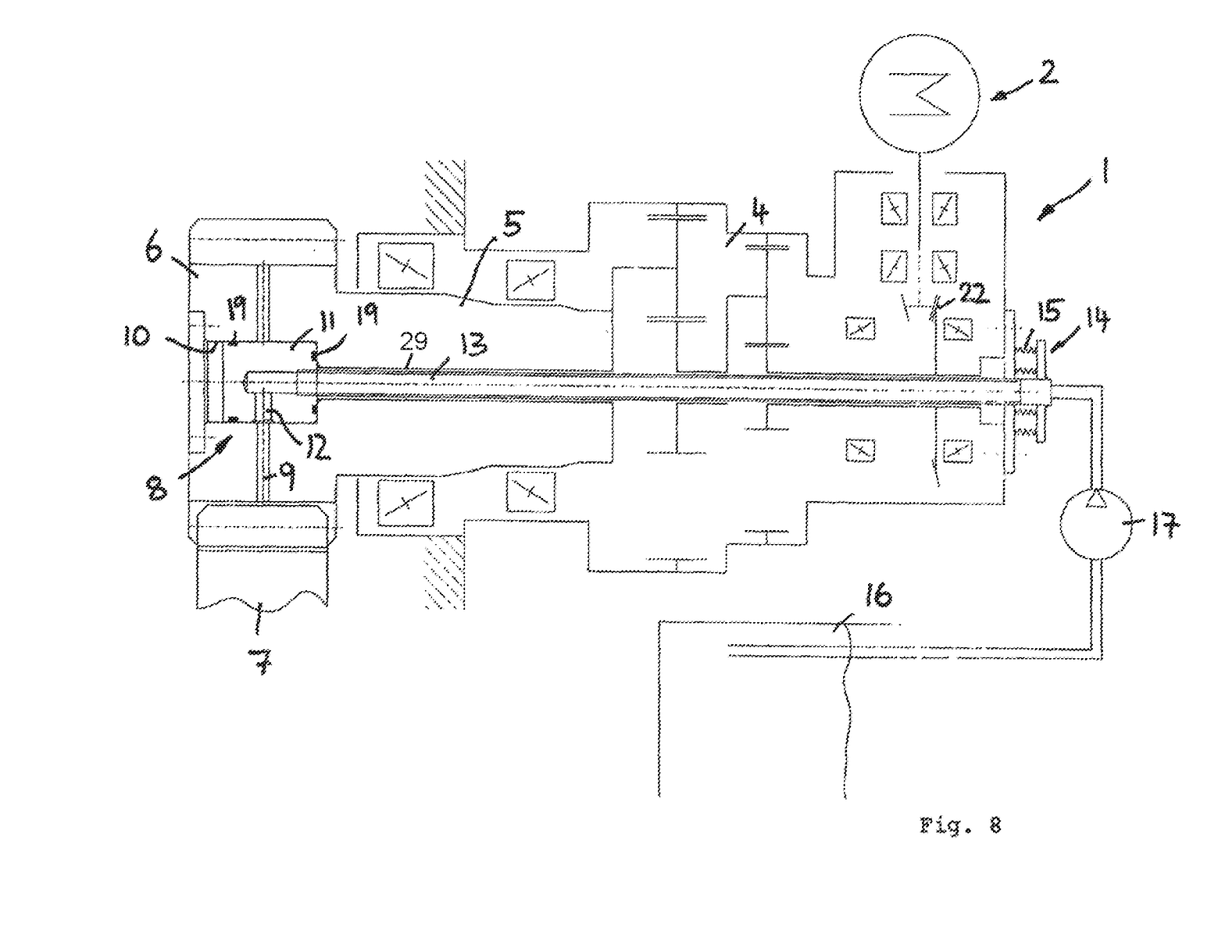
FIG. 8: a schematic representation of a drive similar to FIG. 7 in accordance with a further embodiment, with the fixing and the longitudinal compensation for the distributor being provided at the side of the drive source.

As FIG. 8 shows, the rotational fixing and a longitudinal compensation of the support of the distributor 11 can also take place at the drive source side of the actuator 1 with a lateral connection of the drive source 2, such as is shown both by FIG. 7 and by FIG. 8, with the support 14 here being fixed to the actuator 1 at the front side and holding the supply line 13 or a pipe 29 (e.g., a hollow pipe, a conducting pipe, a bearing pipe) enveloping said supply line 13 rotationally fixedly, but axially resiliently, as the springs 15 indicate. It is understood that the named springs 15 should only symbolically illustrate the resilience, but that an axial resilience without a spring effect can also be provided.

The invention claimed is:

1. A drive for reaching a desired position of a component such as a rotor blade, a crane tower, a superstructure and the like, comprising:
two mutually meshing drive elements, of which at least one is drivable from a drive source and of which the other is connectable to the component; and
a lubrication apparatus, wherein at least one of the two mutually meshing drive elements has lubricant passages for supplying lubricant from the lubrication apparatus to a meshing tooth pair,
wherein the lubrication apparatus has a distributor having a supply passage connectable to the lubricant passages, wherein the lubricant passages are movable relative to the distributor such that the lubricant passages are connected to the supply passage or are cut off from the supply passage according to the position of the lubricant passages relative to the distributor,
wherein the lubricant passages are arranged spaced apart from one another such that a first lubricant passage of the lubricant passages is selectively connectable to the supply passage and a second lubricant passage of the lubricant passages can selectively be cut off from the supply passage by a movement of the lubricant passages relative to the distributor,
wherein a contour of an opening of the supply passage and a respective position and contour of the lubricant passages are coordinated with one another such that, on the movement of lubricant passages relative to the distributor, at least one of the lubricant passages is always connected to the supply passage and such that at most two of the lubricant passages are simultaneously connected to the supply passage, wherein a lubricant cap is attached to an output-side housing part that partly surrounds the drive element connectable to the component, wherein a portion of the lubricant cap is on a radial first side of the drive element having the lubricant passages, wherein the drive element connectable to the component is on a radial second side of the drive element having the lubricant passages, and wherein the radial first side is opposite the radial second side, wherein at least one of the lubricant passages is in an opening region with a lubricant nozzle for spraying the lubricant and for generating a back pressure for the lubricant, and wherein the lubricant nozzle is positioned at a distal downstream end of the at least one of the lubricant passages.

2. The drive of claim 1, wherein the drive element having the lubricant passages is a rotationally drivable output pinion that has an external gearing and/or an internal gearing and that is rotatable with respect to the distributor, wherein the opening of the supply passage and inlet openings of the lubricant passages are arranged in a region of a common part circle concentric to an axis of rotation of the drive element having the lubricant passages.

3. The drive of claim 2, wherein the distributor and the drive element having the lubricant passages have mutually facing end faces at which the lubricant passages and the supply passage each have openings that are on the common part circle concentric to the axis of rotation of the drive element having the lubricant passages.

4. The drive of claim 1, wherein the lubricant passages are arranged in a star shape, and wherein the lubricant passages have inlet openings that lie concentrically with respect to an axis of rotation of the drive element having the lubricant passages on a common part circle.

5. The drive of claim 4, wherein at least one of the two mutually meshing drive elements has an inner recess in which the distributor is at least partly received, wherein at least one of the inlet openings is arranged at a peripheral surface of the inner recess, and wherein the opening of the supply passage is on a peripheral side of the distributor.

6. The drive of claim 1, wherein the distributor is sealed with respect to the at least one of the two mutually meshing drive elements by at least one sealing element such that lubricant exiting from the supply passage can only exit via the lubricant passages connected to the supply passage.

7. The drive of claim 1, wherein at least one of the lubricant passages opens into a dedendum region of at least one of the two mutually meshing drive elements.

8. The drive of claim 1, wherein the distributor is rotationally fixed, and wherein the supply passage is aligned such that the opening of the supply passage faces a spatial region in which one of the two mutually meshing drive elements meshes with the other of the two mutually meshing drive elements.

9. The drive of claim 1, wherein the distributor is supplied with lubricant from a side of the drive element having the lubricant passages opposite the drive source and/or wherein the distributor is rotationally fixedly supported at the side of the drive element having the lubricant passages opposite the drive source.

10. The drive of claim 1, wherein the lubricant cap comprises a cover plate.

11. The drive of claim 1, wherein the drive element having the lubricant passages is between the output-side housing part and the drive element connectable to the component.

12. The drive of claim 1, wherein the distributor is between the lubricant cap and the drive element connectable to the component, and wherein the distributor is between the output-side housing part and the drive element connectable to the component.

13. The drive of claim 1, wherein the output-side housing part is on the radial first side of the drive element having the lubricant passages, wherein the drive element connectable to the component is on the radial second side of the drive element having the lubricant passages, wherein the distributor is between the lubricant cap and the drive element connectable to the component, and wherein the distributor is between the output-side housing part and the drive element connectable to the component.

14. The drive of claim 1, wherein the lubricant passages comprise three or more lubricant passages, wherein at least one of the three or more lubricant passages is always connected to the supply passage, wherein at most two of the three or more lubricant passages are simultaneously connected to the supply passage, wherein at least one of the two mutually meshing drive elements has an inner recess in which the distributor is at least partly received, wherein each of the three or more lubricant passages has an inlet opening, wherein at least one of the inlet openings of the three or more lubricant passages is arranged at a peripheral surface of the inner recess or at a peripheral surface of the distributor according to the position of the lubricant passages relative to the distributor, wherein the opening of the supply passage is on a peripheral side of the distributor, and wherein the opening of the supply passage is in simultaneous communication with at most two inlet openings of the three or more lubricant passages according to the position of the lubricant passages relative to the distributor.

15. A drive for reaching a desired position of a component such as a rotor blade, a crane tower, a superstructure and the like, comprising:

two mutually meshing drive elements, of which at least one is drivable from a drive source and of which the other is connectable to the component; and a lubrication apparatus, wherein at least one of the two mutually meshing drive elements has lubricant passages for supplying lubricant from the lubrication apparatus to a meshing tooth pair, wherein the lubrication apparatus has a distributor having a supply passage connectable to the lubricant passages, wherein the lubricant passages are movable relative to the distributor such that the lubricant passages are connected to the supply passage or are cut off from the supply passage according to the position of the lubricant passages relative to the distributor, wherein the lubricant passages are arranged spaced apart from one another such that a first lubricant passage of the lubricant passages is selectively connectable to the supply passage and a second lubricant passage of the lubricant passages can selectively be cut off from the supply passage by a movement of the lubricant passages relative to the distributor, wherein a contour of an opening of the supply passage and a respective position and contour of the lubricant passages are coordinated with one another such that, on the movement of lubricant passages relative to the distributor, at least one of the lubricant passages is always connected to the supply passage and such that at most two of the lubricant passages are simultaneously connected to the supply passage, wherein a lubricant cap is attached to an output-side housing part that partly surrounds the drive element connectable to the component, wherein a portion of the lubricant cap is on a radial first side of the drive element having the lubricant passages, wherein the drive element connectable to the component is on a radial second side of the drive element having the lubricant passages, and wherein the radial first side is opposite the radial second side, wherein at least one of the lubricant passages is in an opening region with a lubricant nozzle for spraying the lubricant and for generating a back pressure for the lubricant, wherein the lubricant nozzle is positioned at a distal downstream end of the at least one of the lubricant passages, and wherein the output-side housing part is on the radial first side of the drive element having the lubricant passages, wherein the drive element connectable to the component is on the radial second side of the drive element having the lubricant passages, wherein the distributor is between the lubricant cap and the drive element connectable to the component, and wherein the distributor is between the output-side housing part and the drive element connectable to the component.

16. The drive of claim 15, wherein the drive element having the lubricant passages is a rotationally drivable output pinion that has an external gearing and/or an internal gearing and that is rotatable with respect to the distributor, wherein the opening of the supply passage and inlet openings of the lubricant passages are arranged in a region of a common part circle concentric to an axis of rotation of the drive element having the lubricant passages.

17. The drive of claim 15, wherein the distributor is sealed with respect to the at least one of the two mutually meshing drive elements by at least one sealing element such that lubricant exiting from the supply passage can only exit via the lubricant passages connected to the supply passage.

18. The drive of claim 15, wherein at least one of the lubricant passages opens into a dedendum region of at least one of the two mutually meshing drive elements.

19. The drive of claim 15, wherein the distributor is supplied with lubricant from a side of the drive element having the lubricant passages opposite the drive source and/or wherein the distributor is rotationally fixedly supported at the side of the drive element having the lubricant passages opposite the drive source.

20. The drive of claim 15, wherein the lubricant passages comprise three or more lubricant passages, wherein at least one of the three or more lubricant passages is always connected to the supply passage, wherein at most two of the three or more lubricant passages are simultaneously connected to the supply passage, wherein at least one of the two mutually meshing drive elements has an inner recess in which the distributor is at least partly received, wherein each of the three or more lubricant passages has an inlet opening, wherein at least one of the inlet openings of the three or more lubricant passages is arranged at a peripheral surface of the inner recess or at a peripheral surface of the distributor according to the position of the lubricant passages relative to the distributor, wherein the opening of the supply passage is on a peripheral side of the distributor, and wherein the opening of the supply passage is in simultaneous communication with at most two inlet openings of the three or more lubricant passages according to the position of the lubricant passages relative to the distributor.

* * * * *